(12) United States Patent
Miyake et al.

(10) Patent No.: US 8,099,818 B2
(45) Date of Patent: Jan. 24, 2012

(54) WINDOW WIPING SYSTEM

(76) Inventors: Tohru Miyake, Kurashiki (JP);
Hidenori Ishikawa, Takamatsu (JP)

(*) Notice: Subject to any disclaimer, the term of this patent is extended or adjusted under 35 U.S.C. 154(b) by 1227 days.

(21) Appl. No.: 10/528,746

(22) PCT Filed: Sep. 24, 2002

(86) PCT No.: PCT/JP02/09806
§ 371 (c)(1),
(2), (4) Date: Dec. 20, 2005

(87) PCT Pub. No.: WO2004/028324
PCT Pub. Date: Apr. 8, 2004

(65) Prior Publication Data
US 2006/0143845 A1    Jul. 6, 2006

(51) Int. Cl.
*A47L 1/02* (2006.01)
*A47L 11/38* (2006.01)
(52) U.S. Cl. ............... 15/103; 15/319; 15/49.1
(58) Field of Classification Search .......... 257/40, 257/E51.001, E51.022, E51.024, E51.026, 257/E51.027; 438/82, 99; 15/103, 103.5, 15/319, 320, 321, 340.1, 250.1, 250.01, 250.02, 15/250.4, 302, 327.2, 250.11, 220.1, 220.2; 180/264, 6.64, 164, 199, 6.58, 6.6; *A47L 1/02*
See application file for complete search history.

(56) References Cited

U.S. PATENT DOCUMENTS

| 2,668,975 | A | * | 2/1954 | Narajowski | 15/220.2 |
| 5,715,557 | A | * | 2/1998 | Hsu | 15/50.3 |
| 5,890,250 | A | * | 4/1999 | Lange et al. | 15/50.3 |
| 5,959,424 | A | * | 9/1999 | Elkmann et al. | 318/568.12 |

FOREIGN PATENT DOCUMENTS
EP          505956 A1 * 9/1992

* cited by examiner

*Primary Examiner* — Lee D Wilson
*Assistant Examiner* — Jamal Daniel
(74) *Attorney, Agent, or Firm* — Weaver Austin Villeneuve & Sampson LLP

(57) ABSTRACT

This invention provides a window wiper of which the movement is not restricted and which is capable of wiping the entire surface of a windowpane, can be manufactured inexpensively, runs smoothly in any desired directions straight, and does not leave unwiped parts behind. The window wiper comprises a sticking unit 10 which sticks fast to a windowpane "W," a wiping unit 20 which is mounted on the sticking unit 10 and wipes the windowpane "W," and a running unit 30 which is mounted on the sticking unit 10 so that the former can turn freely. Accordingly, the running unit 30 can change its running direction without changing the posture of the wiping unit 20. Therefore, the corners of a windowpane too can be wiped clean by giving a shape with four corners to the wipe-off unit 22 of the wiping unit 20.

9 Claims, 10 Drawing Sheets

WINDOW WIPING SYSTEM

This application is a continuation of International Application No. PCT/JP2002/009806, filed Sep. 24, 2002.

TECHNICAL FIELD

As disclosed in patent literature 1 and 2, there are available window wipers, each of which has a sticking unit to stick fast to a windowpane, a running unit to run and change the running direction, and a wiping unit to wipe the windowpane.

Patent Literature 1: Japanese Unexamined Patent Publication No. 2006-010189

Patent Literature 2: Japanese Unexamined Patent Publication No. 2006-010190

The window wipers of the above prior art have the following problems.

(i) They are for business use and large and heavy; accordingly, they need a large vacuum pump to stick fast to a windowpane. If such a window wiper with a built-in large vacuum pump falls off a windowpane, it is very dangerous; accordingly, the vacuum pump is provided separately from the window wiper and they are connected by a tube. When the window wiper moves on a windowpane, its movement may be restricted by the tube.

(ii) Because the running unit and the wiping unit of the window wiper are fixed, the wiping unit too turns when the running unit turns to change its running direction on a windowpane. Accordingly, if the wiping unit is given a round shape as seen from above so that it can turn in a corner of a windowpane, it leaves part of the corner unwiped. If the wiping unit is given a rectangular shape so as to fit the shape of the windowpane, it cannot turn in a corner of a windowpane. In either case, the window wiper leaves part of a corner unwiped.

(iii) The window wipers of the prior art are for business use and need an exhaust motor and an exhaust fan. Besides, if their control systems become complex, their control systems become expensive and hence they become expensive.

(iv) Such a window wiper is provided with a sticking unit to stick fast to a windowpane and a running unit to run on the windowpane; accordingly, if the friction between the sticking unit and the windowpane and that between the running unit and the windowpane are out of balance, the window wiper cannot run smoothly on the windowpane.

(v) Because the surface of a windowpane is slippery, the wheels of such a window wiper may not go straight on the windowpane, leaving unwiped parts behind.

Under the circumstances, the object of the present invention is to provided a window wiper of which the movement is not restricted and which is capable of wiping the entire surface of a windowpane, can be manufactured inexpensively, runs smoothly in any desired directions straight, and does not leave unwiped parts behind.

DISCLOSURE OF INVENTION

According to the first feature of the present invention, there is provided a window wiper comprising (i) a sticking unit which is fitted with a vacuum generator and sticks fast to a windowpane in a window frame, (ii) a wiping unit which is mounted on the sticking unit and wipes the windowpane, and (iii) a running unit which is mounted on the sticking unit.

According to the second feature of the present invention, there is provided a window wiper comprising (i) a sticking unit which sticks fast to a windowpane in a window frame, (ii) a wiping unit which is mounted on the sticking unit and wipes the windowpane, and (iii) a running unit which is mounted on the sticking unit so that the former can turn freely.

According to the third feature of the present invention, there is provided the window wiper of the second feature. A power supply is disposed below the center of turning of the running unit of the window wiper on the windowpane.

According to the fourth feature of the present invention, there is provided the window wiper of the first or second feature. The window wiper further comprises (i) a top sensor and a bottom sensor which are fixed to the top side and the bottom side, respectively, of the window wiper on the windowpane and detect the window frame and (ii) a controller to which the top and bottom sensors send signals when they have detected the window frame. The controller has a run processor which makes the running unit run vertically, upward and downward, and shift its vertical running course laterally each time the top or bottom sensor detects the window frame.

According to the fifth feature of the present invention, there is provided the window wiper of the fourth feature. The distance of the lateral shift is smaller than the width of the wiping unit.

According to the sixth feature of the present invention, there is provided the window wiper of the first or second feature. The sticking unit has a sucker, and the running unit has wheels. The coefficient of friction between the sucker and the windowpane is smaller than that between the wheels and the windowpane.

According to the seventh feature of the present invention, there is provided the window wiper of the first or second feature. The running unit has wheels and motors for driving the wheels, and the motors are of a stepping type.

According to the eighth feature of the present invention, there is provided the window wiper of the fourth feature. The running unit is provided with sensors for detecting the deviation of the running direction of the running unit, and the controller has a running-direction corrector to correct the deviation of the running direction of the running unit.

According to the ninth feature of the present invention, there is provided the window wiper of the first or second feature. The wiping unit is mounted on the sticking unit so that the former can freely be removed from the latter.

BRIEF DESCRIPTION OF DRAWINGS

FIG. 2 (A) is a plan view of the window wiper of FIG. 1; FIG. 2 (B), a side view.

FIG. 3 (A) is a view taken along the arrowed line III A of FIG. 2 (A); FIG. 3 (B), a view taken along the arrowed line III B; FIG. 3 (C), a view taken along the arrowed line III C.

FIG. 7 (A) is a bottom view of an alternative form of the wipe-off unit of FIG. 6; FIG. 7 (B), a side view; FIG. 7 (C), a sectional view.

BEST MODE FOR CARRYING OUT THE INVENTION

A preferred embodiment of window wiper of the present invention will be described below by referring to the drawings.

Figure 1:
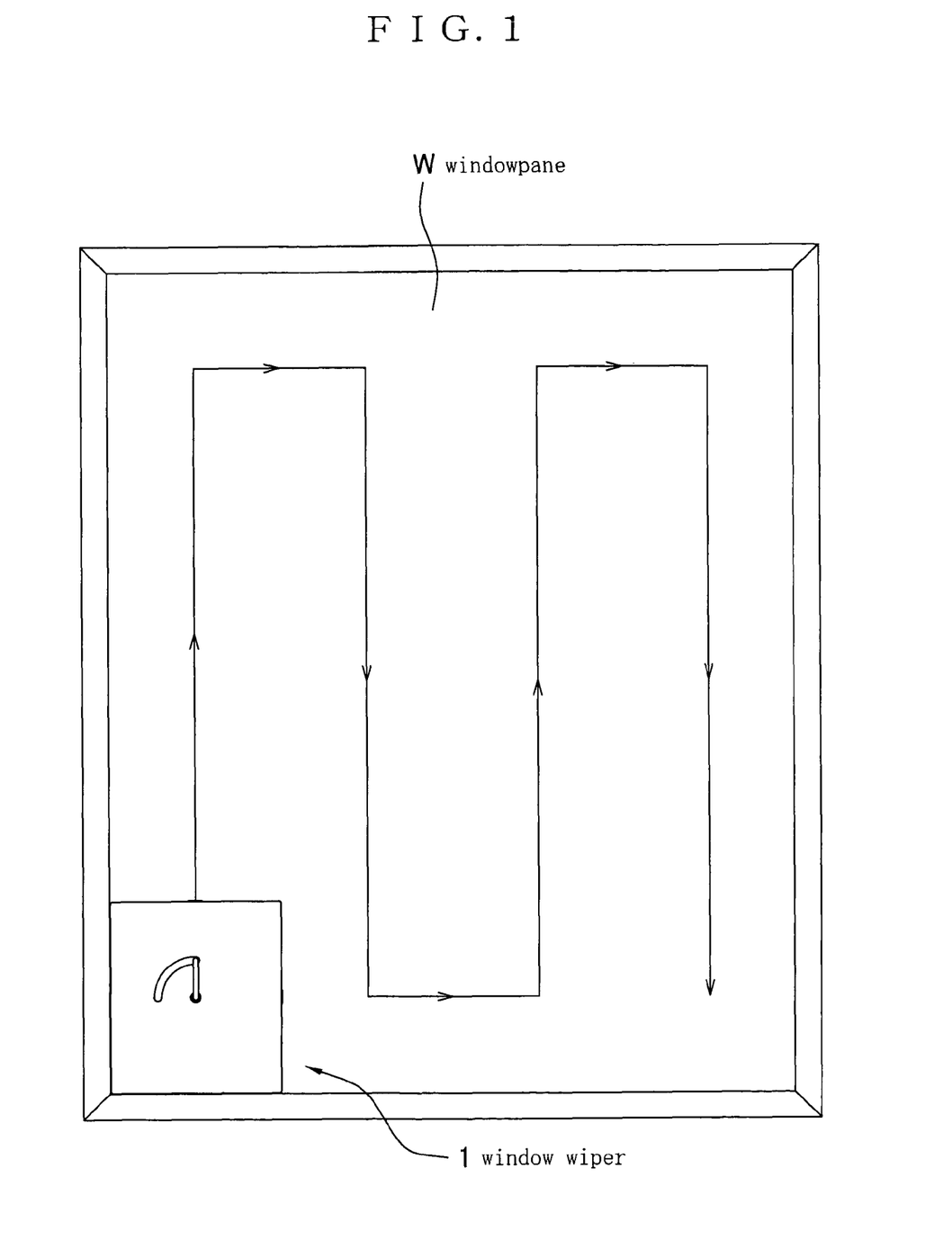
FIG. 1 is an illustration of a window wiper of the present invention which is wiping a windowpane "W."

FIG. 1 is an illustration of the window wiper 1 of the present invention which is wiping a windowpane "W." As shown in FIG. 1, the window wiper 1 wipes the windowpane "W," while sticking fast to and moving on it.

Figure 2:
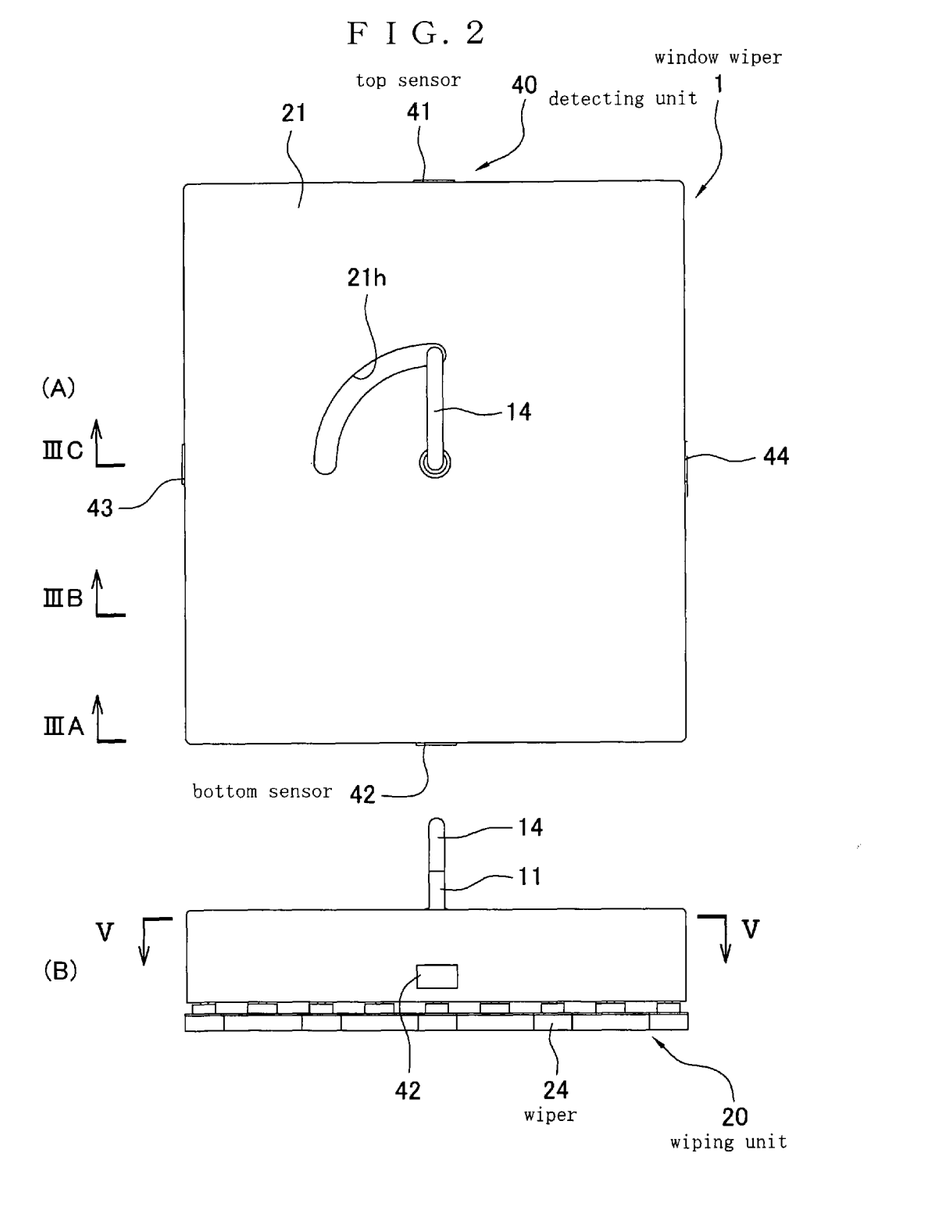
Figure 3:
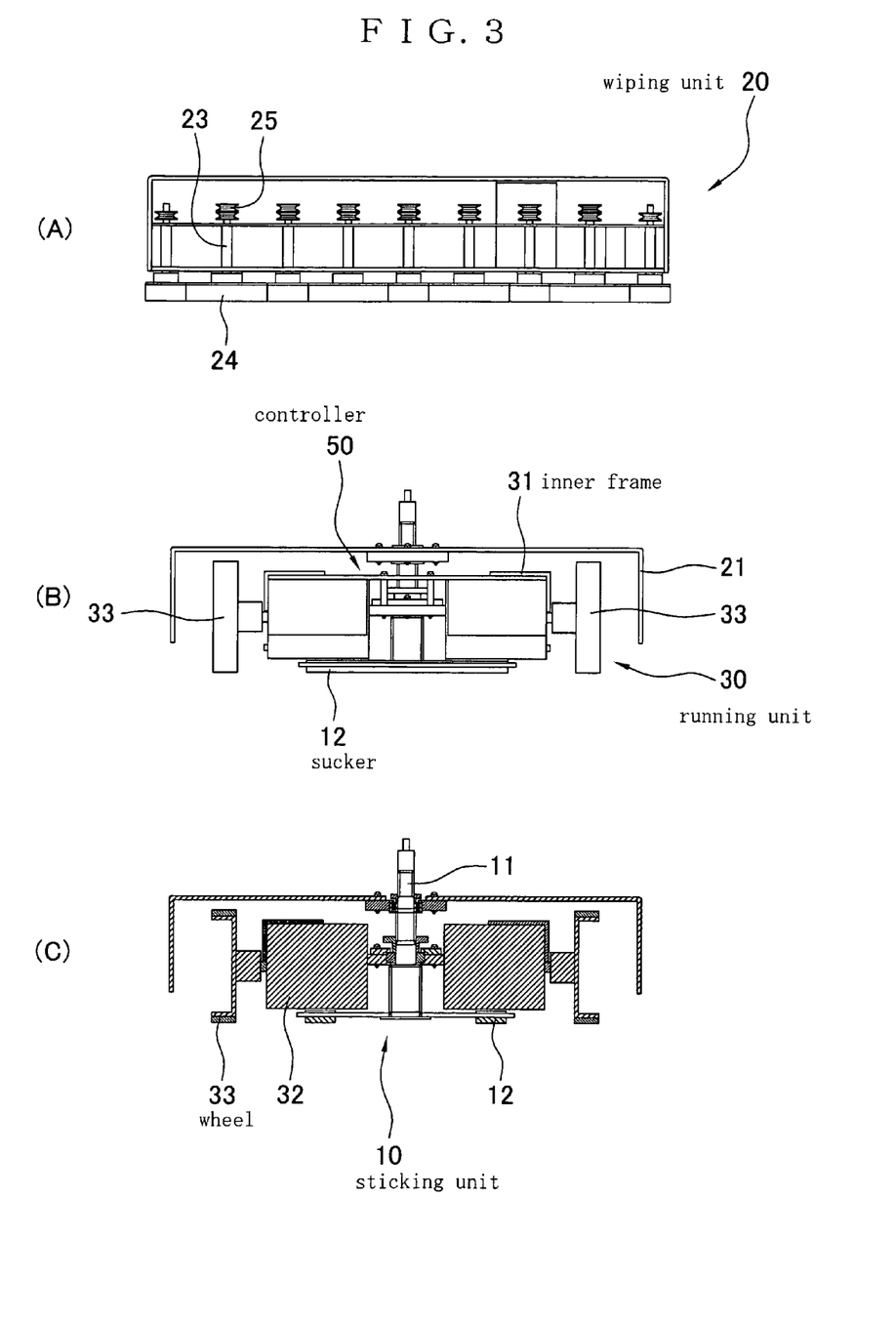

FIG. 2 (A) is a plan view of the window wiper 1; FIG. 2 (B), a side view. FIG. 3 (A) is a view taken along the arrowed line III A of FIG. 2 (A); FIG. 3 (B), a view taken along the arrowed line III B; FIG. 3 (C), a view taken along the arrowed line III C. As shown in FIGS. 2 and 3, the window wiper 1 comprises a sticking unit 10, a wiping unit 20, a running unit 30, a detecting unit 40, and a controller 50.

The sticking unit 10 will be first described below.

Figure 4:
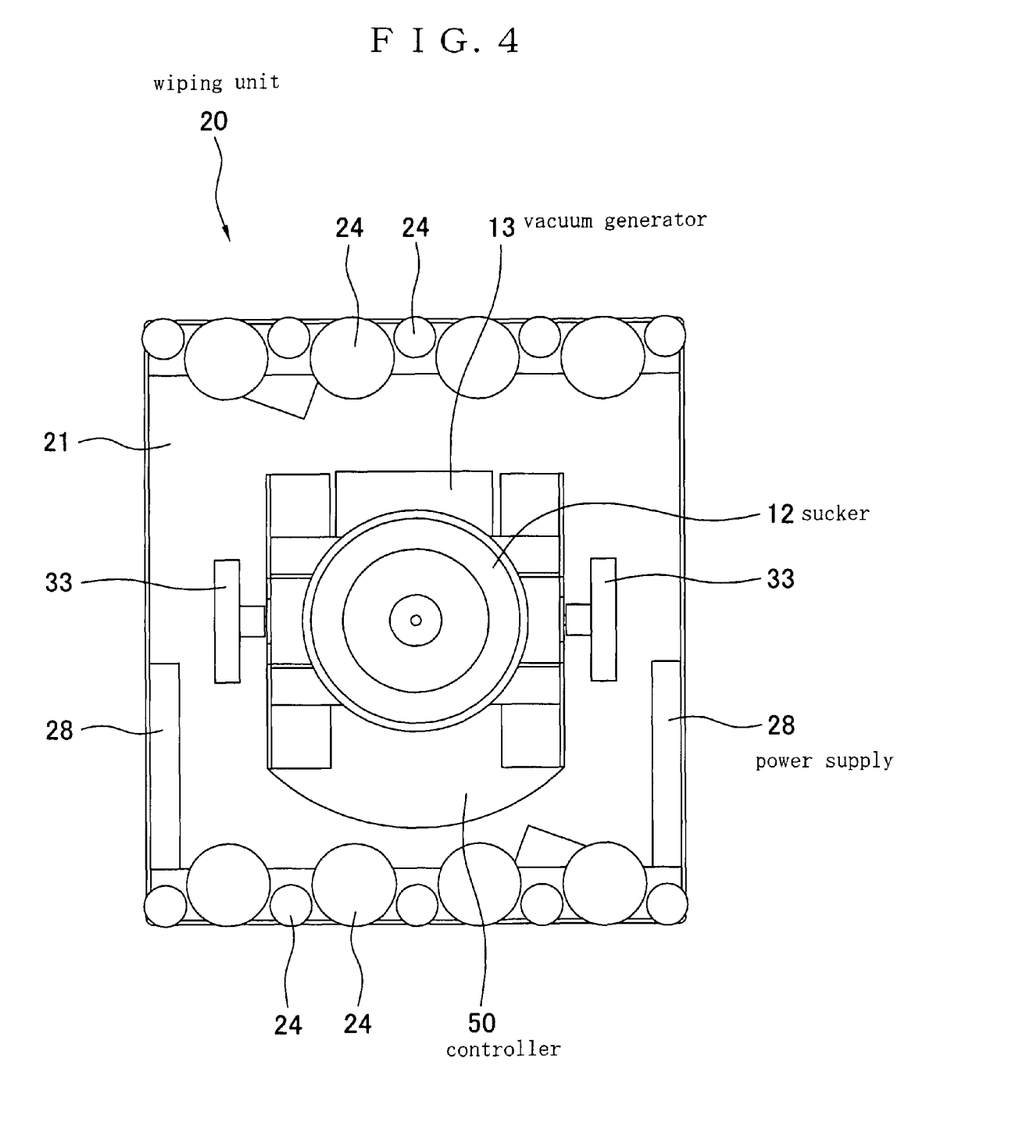
FIG. 4 is a bottom view of the window wiper of FIG. 1.
Figure 5:
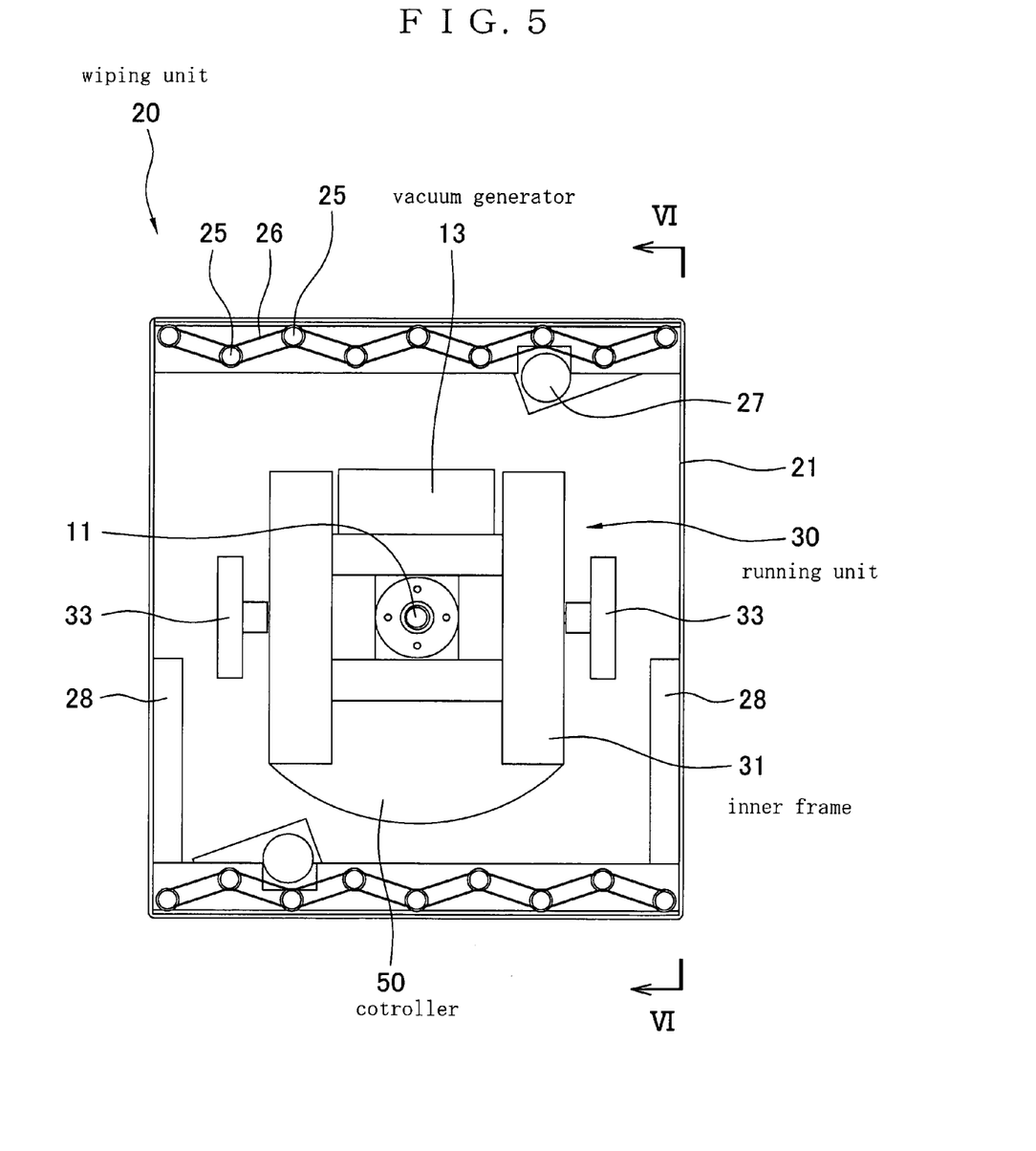
FIG. 5 is a view taken along the arrowed line V-V of FIG. 2 (B).

FIG. 4 is a bottom view of the window wiper 1. As shown in FIG. 4, the window wiper 1 is provided with the sticking unit 10 to stick fast to a windowpane by suction, the sticking unit 10 comprising a suction nozzle 11, a sucker 12, and a vacuum generator 13.

The suction nozzle 11 has a suction hole in its hollow part.

The sucker 12 is fitted to the tip of the suction nozzle 11. The sucker 12 is made of a material of small friction such as a polymer of ethylene tetrafluoride, polyacetal, or acetal resin.

Fitted to the opposite end of the suction nozzle 11 is one end of a connecting tube 14, and the other end of the connecting tube 14 is connected to the vacuum generator 13 such as a vacuum pump or a blower. The vacuum generator 13 is fitted in an inner frame 31 and a power supply 28 to be described later feeds electric power to the vacuum generator 13.

When the vacuum generator 13 sucks air through the sucker 12, the sucker 12 sticks fast to a windowpane. Because the vacuum generator 13 is built into the sticking unit 10, the window wiper 1 does not need an external vacuum pump. Thus, the window wiper 1 is self-propelled and its movement is not restricted.

Besides, because the window wiper 1 sticks fast to a windowpane by suction, it can stick fast to it if a windowpane is of a thick sheet of glass or of a double sheet of glass.

The sticking unit 10 may stick fast to a windowpane by magnetic force. In this case, a pair of magnets may be so disposed that the paired magnets catch a windowpane therebetween, or a magnet and a magnetic body such as an iron plate may be so disposed that they catch a windowpane therebetween. It is desirable that protective film is formed on the surfaces of the paired magnets or the magnet and the magnetic body so that the surfaces of windowpanes are not scratched.

Next, the wiping unit 20 will be described below.

The center of the top of an outer frame 21 is freely journaled on the suction nozzle 11 of the sticking unit 10. The outer frame 21 has a top and four sides, the four sides forming four corners. A wipe-off unit 22 is installed on the bottom end of the outer frame 21.

An aperture 21h in the shape of an arc is made in the top of the outer frame 21, and a tube 14 is inserted in the aperture 21h. The aperture 21h facilitates the turning of the running unit 30.

The wipe-off unit 22 will be described below.

Figure 6:
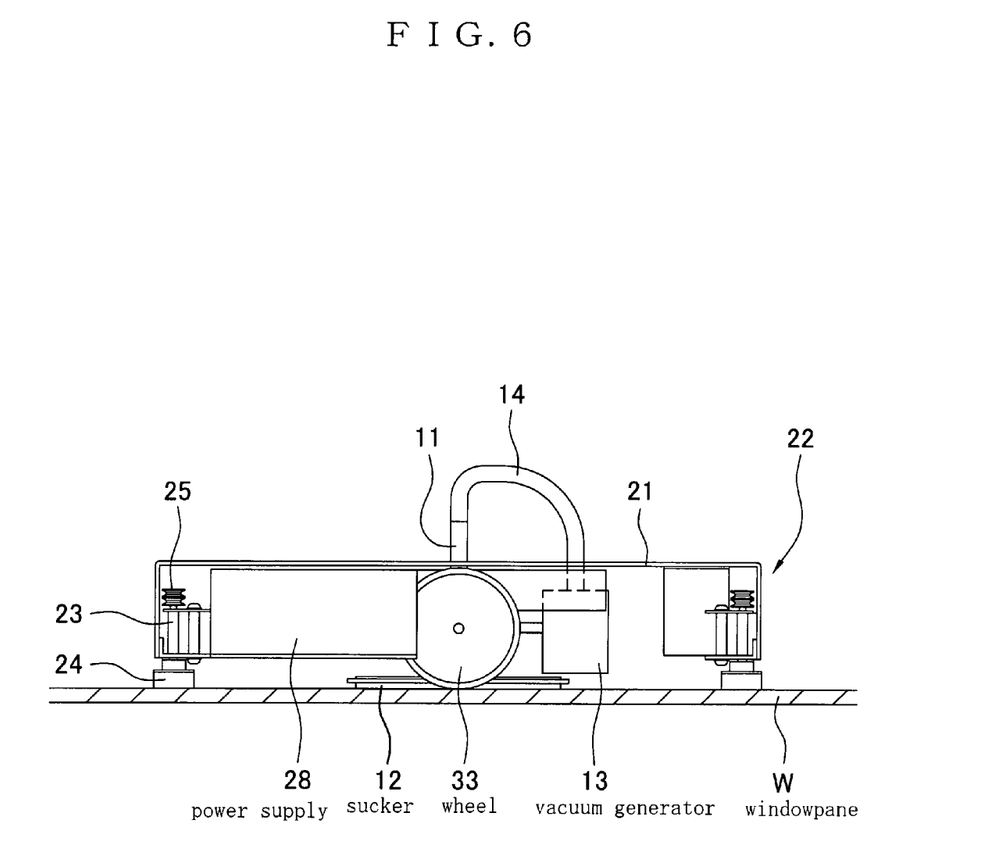
FIG. 6 is a view taken along the arrowed line VI-VI of FIG. 5.

A plurality of shafts 23 are arranged vertically along the lower end of the outer frame 21 so that they can rotate freely. Wipers 24 such as pieces of sponge or brushes are fixed on the lower ends of shafts 23. Pulleys 25 are fixed to the upper ends of shafts 23. An endless belt 26 is laid around any adjacent two pulleys 25 and 25; accordingly, when a motor 27 drives one of the endless belts 26, all the wipers 24 rotate. Thus, the wipers 24 wipe the surface of a windowpane.

The wipers 24 may be driven by gears or the like instead of the pulleys 25 and belts 26.

Besides, the wipers 24 are round and disposed zigzag; accordingly, if the front row of wipers 24 leaves unwiped parts of the surface of a windowpane, the rear row of wipers 24 wipe the unwiped parts.

Figure 7:
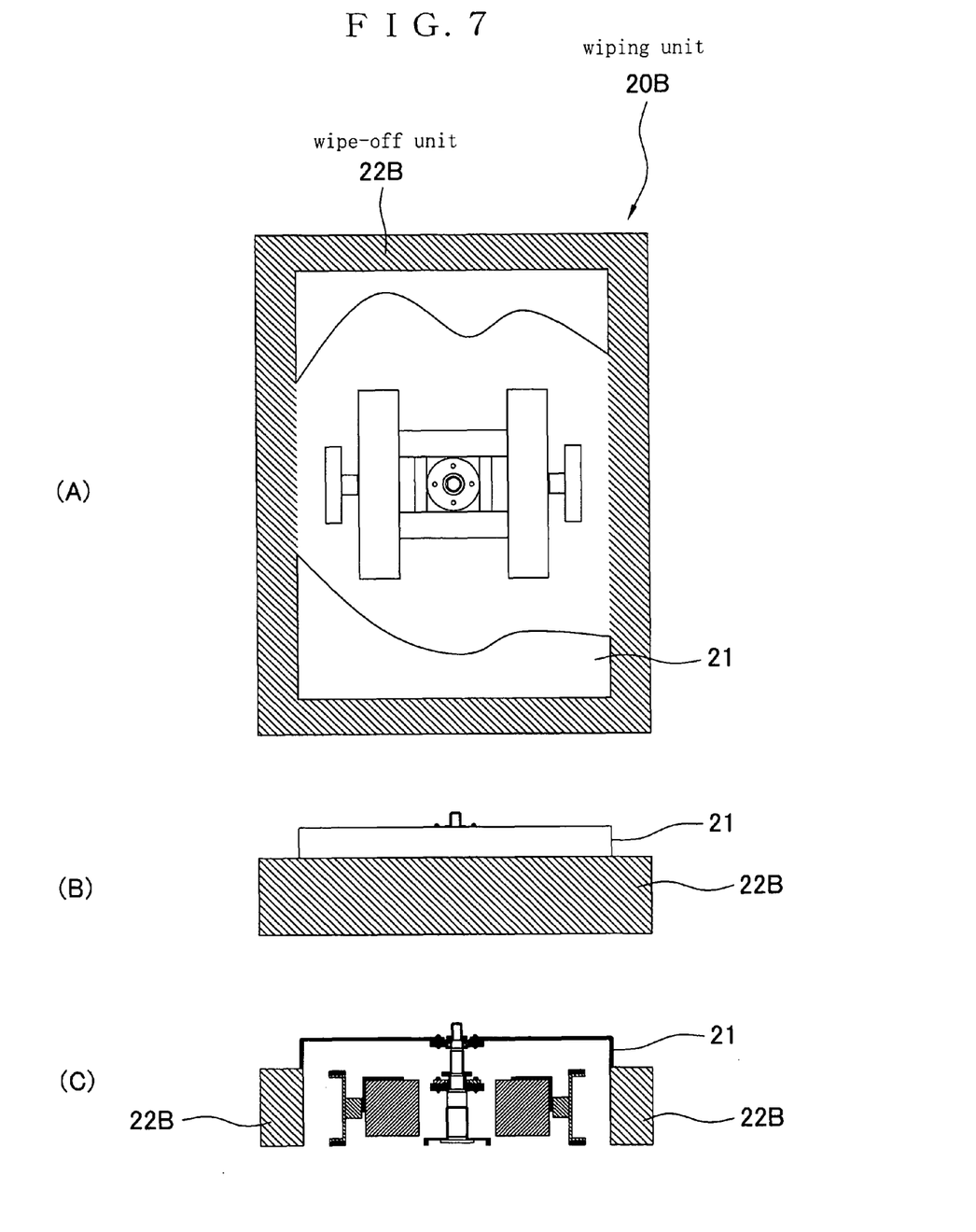

FIG. 7 shows another wipe-off unit 22B. The wipe-off unit 22B is sponge, brushes, or the like directly fixed to the bottom end of the outer frame 21. Thus, the construction of the wipe-off unit 22B is simple.

A power supply 28 such as a battery is built into the outer frame 21 to drive the wiper motors 27 mentioned earlier and running motors 32 to be described later. The power supply 28 is disposed below the center of turning of the running unit 30 for reason to be described later.

Next, the running unit 30 will be described below.

The running unit 30 is freely journaled on the suction nozzle 11. The running unit 30 comprises an inner frame 31, running motors 32, and wheels 33.

The inner frame 31 has a top and four sides. The center of the top of the inner frame 31 is freely journaled on the suction nozzle 11 of the sticking unit 10.

A pair of running motors 32 are mounted on the sides of the inner frame 31.

The wheels 33 are fixed to the shafts of the running motors 32.

The running motors 32 are of a stepping type and capable of turning the wheels 33 by desired turning angles and running certain distances accurately; accordingly, the vertical running course of the window wiper 1 can be shifted laterally by certain distance; accordingly, the window wiper 1 can wipe the entire surface of a windowpane completely.

The running motors 32 may be of an ordinary type instead of a stepping type.

The window wiper 1 moves forward and backward by rotating the wheels 33 forward and backward. When one wheel 33 is rotated forward and the other wheel 33 is rotated backward, the running unit 30 is turned into a lateral direction.

Thus, the running motors 32 drive the wheels 33 to move the window wiper 1 forward and backward and to turn the running unit 30 into a lateral direction and move the window wiper 1 laterally.

When the running unit 30 turns by 90 degrees, the power supply 28 serves as a weight to keep the bottom of the wiping unit 20 downward. Thus, the wiping unit 20 is prevented from following the turning running unit 30 and kept in its correct posture.

The wheels 33 are made of rubber and their coefficient of friction is high. On the other hand, the coefficient of friction of the sucker 12 of the sticking unit 10 is low.

Because the coefficient of friction of the sucker 12 is smaller than that of the wheels 33, the window wiper 1 can move smoothly on a windowpane.

Next, the detecting unit 40 will be described below.

The top, bottom, left, and right sides of the outer frame 21 are provided with top, bottom, left, and right sensors 41, 42, 43, and 44, respectively. These sensors 41, 42, 43, and 44 are limit switches or the like and detect window frames.

The sensors 41, 42, 43, and 44 may be proximity switches or position-detecting elements of a non-contact type.

Deviation sensors 45 such as gyrosensors, angular-velocity sensors, and inclination sensors are fitted to appropriate parts of the running unit 30. The deviation sensors 45 detect the deviation of the running direction of the running unit 30.

Next, the controller 50 will be described below.

Figure 8:
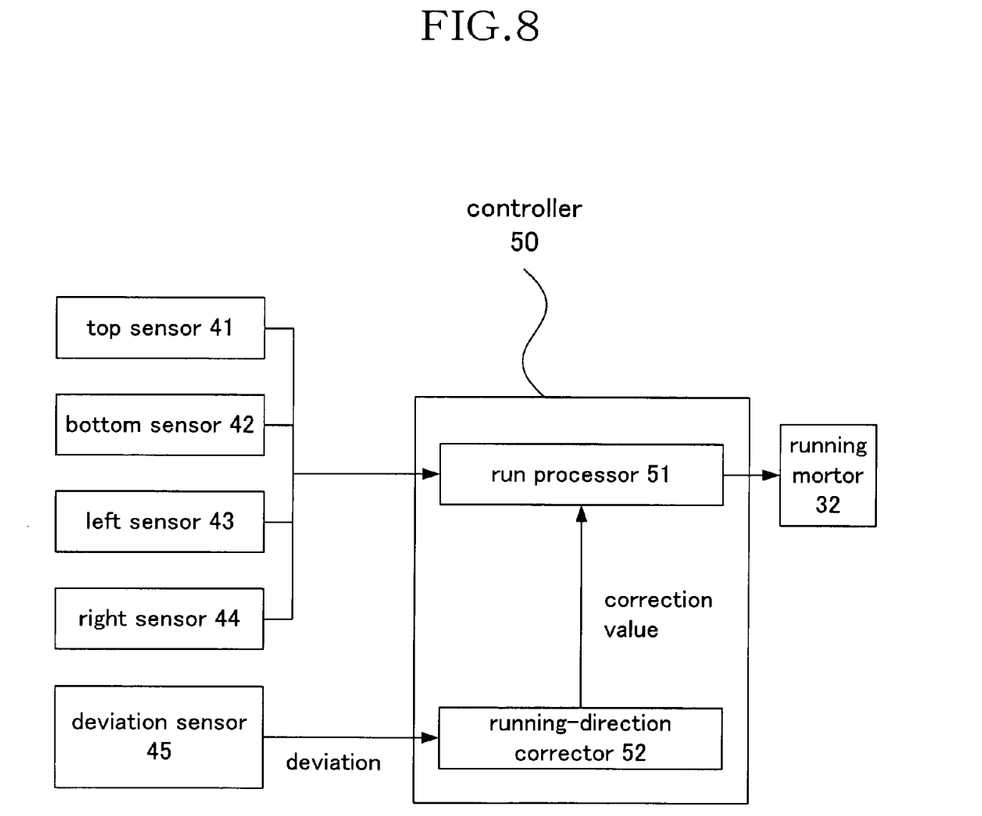
FIG. 8 is a block diagram of the controller shown in FIG. 3 (B).

FIG. 8 is a block diagram of the controller 50. As shown in FIG. 8, signals of the detecting unit 40 are sent to the controller 50. The controller 50 comprises a run processor 51 and a running-direction corrector 52.

The run processor 51 receives signals from the window-frame sensors 41, 42, 43, and 44 and controls the rotation of the wheels 33.

Figure 9:
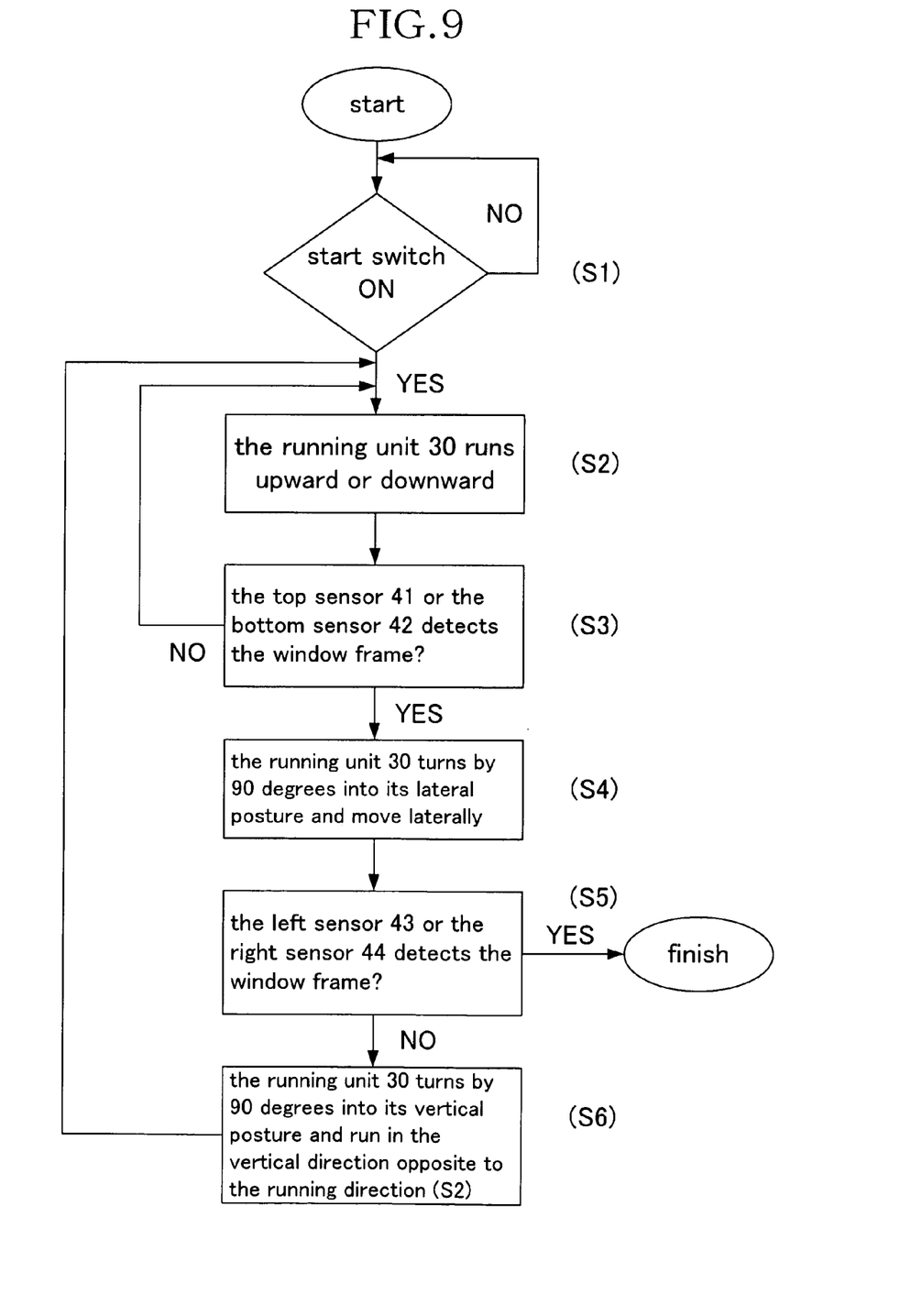
FIG. 9 is a flowchart of the processing by the run processor shown in FIG. 8.

FIG. 9 is a flowchart of the processing by the run processor 51. As shown in FIG. 9, the run processor 51 makes processing as follows. When the start switch is turned on (S1), the run processor 51 makes the running unit 30 run upward or downward (S2). When the top sensor 41 or the bottom sensor 42 detects the window frame (S3), the run processor 51 makes the running unit 30 turn by 90 degrees into its lateral posture and move laterally (S4). If the left sensor 43 or the right sensor 44 detects the window frame (S5), the processing is finished. If the left and right sensors 43 and 44 do not detect the window frame (S5), the run processor 51 makes the running unit 30 turn by 90 degrees into its vertical posture and run in the vertical direction opposite to the running direction in Step 2 (S6). Thus, the vertical running course of the window wiper 1 can be shifted laterally. Then, the Steps 2 to 6 are repeated.

Thus, the window wiper 1 wipes the entire surface of the windowpane.

If the distance of the lateral shift of the window wiper 1 is smaller than the width of the wiping unit 20, adjacent vertical wiping zones overlap each other; accordingly, the window wiper 1 wipes the entire surface of a windowpane without fail.

The running-direction corrector 52 receives signals about the deviation detected by the deviation sensors 45 and sends a correction value to the run processor 51 to correct the running direction of the running unit 30.

The running-direction corrector 52 performs feedback correction when the running unit 30 deviates from its vertical running course; accordingly, the running unit 30 runs straight.

The window wiper 1 runs automatically, but it may be controlled by a remote controller.

Besides, the window wiper 1 is for domestic use, but it may be for business use.

Next, the process of using the window wiper 1 will be described.

Figure 10:
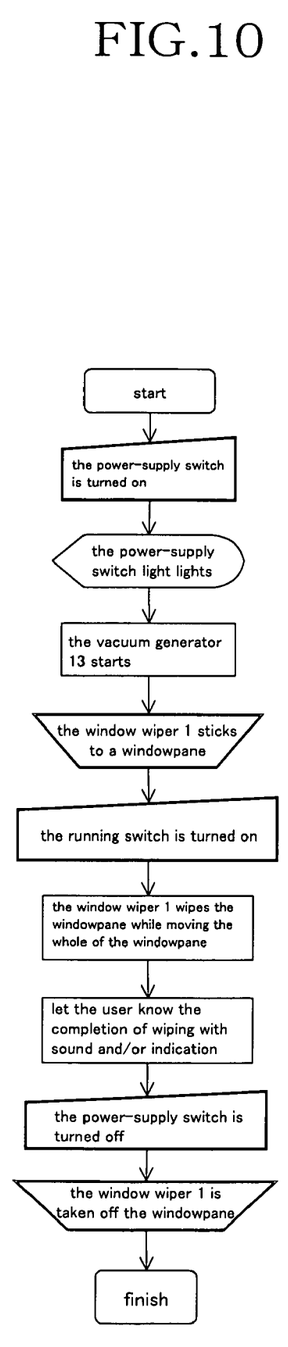
FIG. 10 is a flowchart of the process of using the window wiper of FIG. 1.

FIG. 10 is a flowchart of the process of using the window wiper 1. As shown in FIG. 10, when the power-supply switch of the window wiper 1 is turned on, the vacuum pump starts and the window wiper 1 sticks fast to a windowpane. When the running switch is turned on, the window wiper 1 starts to wipe the windowpane. The window wiper 1 wipes a windowpane, moving upward and downward, shifting its vertical running course laterally each time it reaches the top or bottom member of the window frame; Accordingly, the window wiper 1 is capable of wiping the entire surface of a windowpane. When the window wiper 1 reaches the distant side member of the window frame, the window wiper 1 stops automatically, indicating the completion of wiping with sound and/or indication. Then, the power-supply switch of the window wiper 1 is turned off to stop the vacuum pump and the window wiper 1 is taken off the windowpane.

Signals indicating trouble and completion of wiping may be transmitted to a portable telephone or personal computer.

The workings and effect of the window wiper 1 are as follows.

(1) The vacuum generator 13 is built into the sticking unit 10; therefore, the window wiper 1 does not need an external vacuum pump and is mobile under no restriction of movement.

(2) The running unit 30 is mounted on the sticking unit 10 so that the former can turn freely; therefore, the running direction of the running unit 30 can be changed without changing the posture of the wiping unit 20. Accordingly, the corners of a windowpane too can be wiped clean by giving a shape with four corners to the wipe-off unit 22 of the wiping unit 20.

(3) The power supply 28 is disposed below the center of turning of the running unit 30; therefore, the wiping unit 20 is prevented from following the running unit 30 when the latter turns. Thus, the wiping unit 20 is kept in its correct posture.

(4) The run processor 51 makes the running unit 30 run vertically, upward and downward, and shift its vertical running course laterally each time the window wiper 1 reaches the top or bottom member of the window frame; therefore, the window wiper 1 wipes windowpanes clean. Besides, the window wiper 1 can be controlled with inexpensive sensors and control system; therefore, the window wiper 1 can be manufactured at a low cost.

(5) Because the distance of the lateral shift of the window wiper 1 is smaller than the width of the wiping unit 20, adjacent vertical wiping zones overlap each other; accordingly, the window wiper 1 wipes the entire surface of a windowpane without fail.

(6) Because the coefficient of friction of the sucker 12 is smaller than that of the wheels 33, the window wiper 1 can move smoothly on a windowpane.

(7) The running motors 32 are of a stepping type and capable of turning the wheels 33 by desired turning angles and running certain distances accurately; accordingly, the vertical running course of the window wiper 1 can be shifted laterally by certain distance; accordingly, the window wiper 1 can wipe the entire surface of a windowpane completely.

(8) The running-direction corrector 52 receives signals about the deviation detected by the deviation sensors 45 and performs feedback correction to make the running unit 30 run straight in a desired direction.

(9) Because the wiping unit 20 can be removed from the sticking unit 10, the maintenance of the wiping unit 20 is easy.

INDUSTRIAL APPLICABILITY

According to the first feature of the present invention, the sticking unit is provided with a vacuum generator. Thus, the window wiper 1 does not need an external vacuum pump and is mobile under no restriction of movement.

According to the second feature of the present invention, the running unit is mounted on the sticking unit so that the former can turn freely; therefore, the running direction of the running unit can be changed without changing the posture of the wiping unit. Accordingly, the corners of a windowpane too can be wiped clean by giving a shape with four corners to the wipe-off unit of the wiping unit.

According to the third feature of the present invention, the power supply is disposed below the center of turning of the running unit; therefore, the wiping unit is prevented from following the running unit when the latter turns. Thus, the wiping unit is kept in its correct posture.

According to the fourth feature of the present invention, the run processor makes the running unit run vertically, upward and downward, and shift its vertical running course laterally each time the window wiper reaches the top or bottom member of the window frame; therefore, the window wiper wipes the windowpane clean. Besides, the window wiper can be controlled with inexpensive sensors and control system; therefore, the window wiper can be manufactured at a low cost.

According to the fifth feature of the present invention, the distance of the lateral shift of the window wiper is smaller than the width of the wiping unit; therefore, adjacent vertical wiping zones overlap each other. Accordingly, the window wiper wipes the entire surface of a windowpane without fail.

According to the sixth feature of the present invention, the coefficient of friction of the sucker is smaller than that of the wheels; therefore, the window wiper can move smoothly on a windowpane.

According to the seventh feature of the present invention, the running motors are of a stepping type and capable of turning the wheels by desired turning angles and running certain distances accurately; accordingly, the vertical running course of the window wiper can be shifted laterally by certain distance. Therefore, the window wiper can wipe the entire surface of a windowpane completely.

According to the eighth feature of the present invention, the running-direction corrector receives signals about the deviation detected by the deviation sensors and performs feedback correction to make the running unit run straight in a desired direction. Accordingly, the window wiper wipes the entire surface of a windowpane without fail.

According to the ninth feature of the present invention, the wiping unit can be removed from the sticking unit. Therefore, the maintenance of the wiping unit is easy.

The invention claimed is:

1. A window wiper comprising:
a sticking unit which is adapted to adhere to a windowpane in a window frame when in use;
a wiping unit which is mounted on the sticking unit and fitted in a rectangular outer frame; and
a running unit which is mounted on the sticking unit and fitted in an inner frame turnable in the outer frame, said inner and outer frames being freely rotatable with respect to each other such that said running unit serves to cause said inner frame to rotate.

2. The window wiper according to claim 1, wherein the wiping unit is mounted on the sticking unit so that the former can freely be removed from the latter.

3. A window wiper comprising:
a sticking unit which is adapted to adhere to a windowpane in a window frame when in use;
a wiping unit which is mounted on the sticking unit and fitted in a rectangular outer frame; and
a running unit which is mounted on the sticking unit and fitted in an inner frame turnable in the outer frame, said inner and outer frames being freely rotatable with respect to each other;
wherein the inner frame is fitted with a vacuum generator which is a component of the sticking unit.

4. The window wiper according to claim 3, wherein a power supply is disposed below the center of the running unit of the outer frame of the window wiper on the windowpane.

5. A window wiper comprising:
a sticking unit which is adapted to adhere to a windowpane in a window frame when in use;
a wiping unit which is mounted on the sticking unit and fitted in a rectangular outer frame;
a running unit which is mounted on the sticking unit and fitted in an inner frame turnable in the outer frame, said inner and outer frames being freely rotatable with respect to each other;
a top sensor and a bottom sensor which are fixed to the top side and the bottom side, respectively, of the window wiper on the windowpane and detect the window frame; and
a controller to which the top and bottom sensors send signals when they have detected the window frame,
the controller having a run processor which makes the running unit run vertically, upward and downward, and shift its vertical running course laterally each time the top or bottom sensor detects the window frame.

6. The window wiper according to claim 5, characterized by the distance of the lateral shift which is smaller than the width of the wiping unit.

7. The window wiper according to claim 5, wherein:
the running unit is provided with sensors for detecting the deviation of the running direction of the running unit; and
the controller has a running-direction corrector to correct the deviation of the running direction of the running unit.

8. A window wiper comprising:
a sticking unit which is adapted to adhere to a windowpane in a window frame when in use;
a wiping unit which is mounted on the sticking unit and fitted in a rectangular outer frame; and
a running unit which is mounted on the sticking unit and fitted in an inner frame turnable in the outer frame, said inner and outer frames being freely rotatable with respect to each other;
wherein:
the sticking unit has a sucker; and
the running unit has wheels,
the coefficient of friction between the sucker and the windowpane being smaller than that between the wheels and the windowpane.

9. A window wiper comprising:
a sticking unit which is adapted to adhere to a windowpane in a window frame when in use;
a wiping unit which is mounted on the sticking unit and fitted in a rectangular outer frame; and
a running unit which is mounted on the sticking unit and fitted in an inner frame turnable in the outer frame, said inner and outer frames being freely rotatable with respect to each other;
wherein:
the running unit has wheels and motors for driving the wheels; and
the motors are of a stepping type.

* * * * *